United States Patent
Ohhashi (12)

(10) Patent No.: US 6,685,220 B2
(45) Date of Patent: Feb. 3, 2004

(54) AIRBELT AND AIRBELT APPARATUS

(75) Inventor: Kiyotaka Ohhashi, Sakata-gun (JP)

(73) Assignee: Takata Corporation, Tokyo (JP)

( * ) Notice: Subject to any disclaimer, the term of this patent is extended or adjusted under 35 U.S.C. 154(b) by 85 days.

(21) Appl. No.: 10/091,407

(22) Filed: Mar. 7, 2002

(65) Prior Publication Data

US 2002/0125702 A1 Sep. 12, 2002

(30) Foreign Application Priority Data

Mar. 7, 2001 (JP) ........................................ 2001-063639

(51) Int. Cl.[7] .............................................. B60R 21/18
(52) U.S. Cl. ............... 280/733; 139/383 R; 139/384 R; 139/387 R; 139/388; 139/389; 139/390; 139/426 R; 206/6; 220/23.2; 220/23.8; 220/23.86; 220/62.11; 220/62.18; 220/62.19; 280/728.1; 280/730.1; 280/736; 280/801.1; 280/801.2; 280/803; 280/804; 428/34.1; 428/34.3; 428/34.5; 428/34.6; 428/99; 428/122; 428/128; 442/189; 442/199; 442/203; 442/205; 442/208; 442/301
(58) Field of Search .................................. 139/429, 432, 139/383 R, 384 R, 387 R, 388, 389, 390, 407, 408, 409, 410, 413, 426 R, 383 B; 206/6; 220/23.2, 23.8, 23.86, 520, 521, 62.11, 62.18, 62.19; 280/727, 728.1, 728.2, 728.3, 729, 730.1, 733, 736, 801.1, 801.2, 802, 803, 804, 808; 428/34.1, 34.3, 34.5, 34.6, 99, 122, 125; 442/183, 189, 199, 203, 205, 208, 301

(56) References Cited

U.S. PATENT DOCUMENTS 5,346,250 A 9/1994 Kamiyama .................. 280/733
5,465,999 A 11/1995 Tanaka et al.

FOREIGN PATENT DOCUMENTS

| DE | 198 55 542 A1 | 6/2000 |
| FR | 2 591 620 A1 | 6/1987 |
| JP | 5-85301 | 6/1993 |
| WO | WO 00/20671 A1 | 4/2000 |

*Primary Examiner*—Arti R. Singh
(74) *Attorney, Agent, or Firm*—Foley & Lardner

(57) ABSTRACT

An airbelt is provided that passes smoothly through an anchor and winds around a retractor. The airbelt includes a non-inflating section and a flat hollow-cylindrical inflating section. A bag is arranged only within the inflating section. An end of the bag as well as an end of the belt is connected to a tongue. The non-inflating section is inserted into a through-anchor and is connected to a retractor so as to enable to be wound up around and pulled out of the retractor. The belt is consecutively and integrally made by knitting or weaving all the parts extending from the non-inflating section toward the inflating section. A weft thread, which is lined up with a fusion thread such as a thread having a core-sheath structure, is inserted into the non-inflating section so as to be processed with heat.

6 Claims, 5 Drawing Sheets

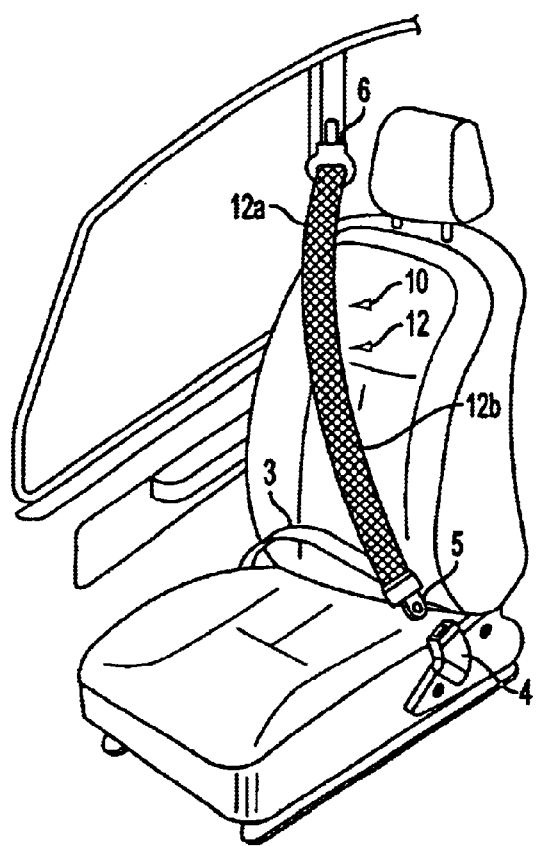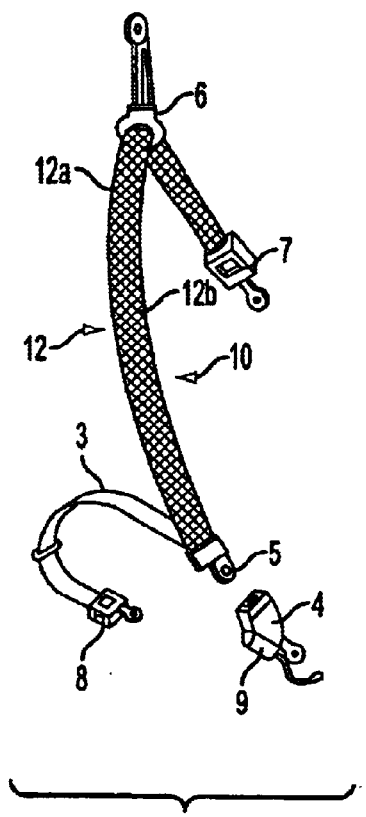
FIG. 1A
FIG. 1B

AIRBELT AND AIRBELT APPARATUS

BACKGROUND

The present invention relates to an airbelt apparatus and an airbelt thereof for protecting an occupant of a moving object such as a vehicle upon a collision, and more specifically relates to an airbelt and an airbelt apparatus, in which an internal bag is inflated by gas from a gas generator.

Such an airbelt apparatus is disclosed in Japanese Unexamined Patent Application Publication No. 5-85301. FIG. 6 is a perspective view of an airbelt apparatus according to the Publication.

As shown in FIG. 1, the airbelt apparatus 1 includes an airbelt 2 diagonally extending from the right of an occupant to the left, a webbing 2a with one end connected to the airbelt 2, a lap belt 3 extending from the right of the occupant to the left, a buckle device 4 disposed on the floor of a vehicle body, etc., a tongue 5 to be inserted into and engaged with the buckle device 4 when the belt is fitted, and a through-anchor 6 for guiding the webbing 2a.

The webbing 2a comprises a normal belt similar to a conventional and general seatbelt. The webbing 2a is slidably guided and hung-through by the through-anchor 6. The other end of the webbing 2a is connected to an emergency-locking-seatbelt retractor (ELR) 7 that is capable of winding up the webbing.

The upper end of the airbelt 2 is connected to the webbing 2a by sewing, etc., and the lower end of the airbelt is connected to the tongue 5 for connection to the buckle device 4.

The lap belt 3 is formed of a normal belt similar to a general seatbelt. One end of the lap belt 3 is connected to the tongue 5, while the other end is connected to a seatbelt retractor (ELR) 8 fixed to the vehicle body. A gas generator 9 is connected to the buckle device 4 for generating high-pressure gas when required in an emergency situation such as a vehicle collision.

The tongue 5 and the buckle device 4 are provided with a path for introducing gas from the gas generator 9 to the airbelt 2.

The airbelt 2 is a large-width belt-like bag, which is folded into a small-width belt-shape and is covered with a cover. The airbelt 2 retains its belt-shape under normal conditions. The airbelt apparatus 1 is used in a manner similar to that of a general seatbelt. When the gas generator 9 is operated upon a vehicle collision, etc., the airbelt 2 is inflated, as is shown in FIG. 6 by the dashed lines, so as to protect the occupant.

In the conventional airbelt apparatus described above, the separate webbing 2a is required to be connected to the airbelt 2 and wound around the retractor 7, because the thickness of the airbelt 2 is larger than that of the webbing 2a. As a result, the airbelt 2 is difficult to be passed through the through-anchor 6 and also difficult to be wound around the retractor 7.

SUMMARY OF THE INVENTION

It is therefore an object of the present invention to pass a belt, which is consecutively integrated with an inflating section of an airbelt, through a through-anchor and to wind the belt directly around a retractor, while omitting a separate webbing such as, for example, webbing 2a shown in FIG. 6.

According to the present invention an airbelt is provided. The airbelt comprises a belt, of which one half side of the longitudinal direction is a hollow and inflatable inflating section and the other half side is a non-inflating section. The airbelt further includes a bag placed within the inflating section of the belt, wherein the airbelt is inflated by introduction of gas into the bag. The belt may be consecutively and integrally made of a knitted fabric extending from the inflating section toward the non-inflating section. The airbelt also includes a weft thread comprising a fusion thread that is inserted into the non-inflating section.

Due to the weft thread being inserted into the non-inflating section of such an airbelt, when the non-inflating section is wound around the retractor, the airbelt cannot expand in the width direction. As a result the airbelt may be very smoothly wound around the retractor. Because the weft thread includes the fusion thread, by processing with heat, the non-inflating section has pliant rigidity while having extremely high strength.

The weft thread may be made of only the fusion thread or may be formed to include both the fusion thread and a non-fusion thread. When the weft thread is made of only the fusion thread, the knitting is simple. When the weft thread is lined up with the fusion thread and the non-fusion thread, the non-inflating section has extremely high strength.

In a preferred embodiment, the fusion thread comprises a thread having core-sheath structure including a core made of a regular polyester thread and a sheath made of thermo-fusion polyester. In the thread of the core-sheath structure, the core exhibits sufficient strength while the sheath exhibits sufficient fusion strength.

According to the present invention an airbelt apparatus may also be provided. The apparatus includes an airbelt to be inflatable by a gas generator, and may be mounted on a vehicle such as an automobile together with a tongue connected to one end of the airbelt and a retractor for winding the other end side of the airbelt.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIG. 1(a) is a perspective view of a vehicle interior having an airbelt apparatus according to an embodiment of the present invention.

FIG. 1(b) is a perspective view of the airbelt apparatus of FIG. 1(a).

DESCRIPTION

Figure 2A:
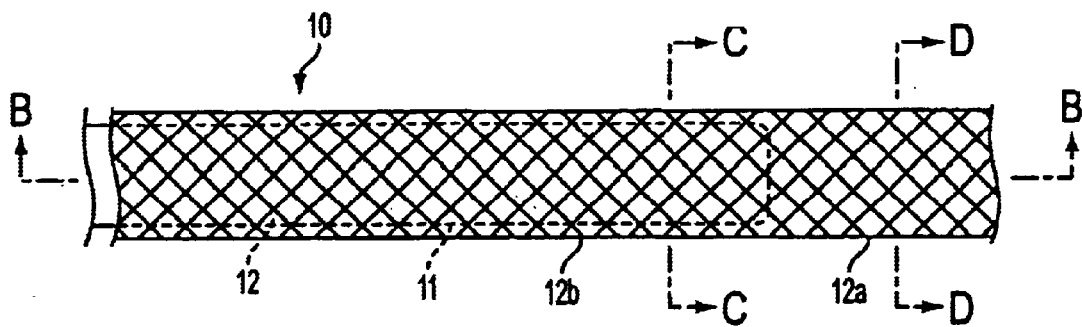
FIG. 2(a) is a plan view of an airbelt according to the present invention.
Figure 2B:
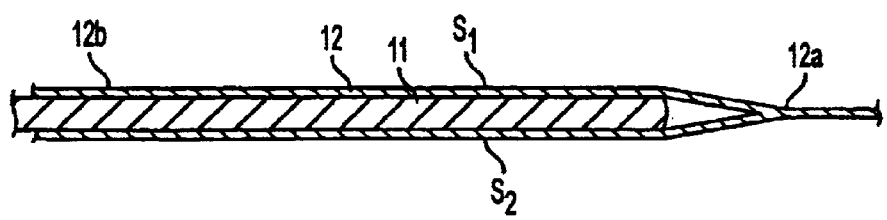
FIGS. 2(b) to 2(d) are enlarged sectional views at lines B—B, C—C, and D—D of FIG. 2(a), respectively.
Figure 2C:
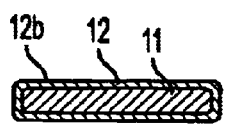
Figure 2D:

An exemplary embodiment according to the present invention will be described below with reference to the drawings.

An airbelt 10 of an airbelt apparatus according to the exemplary embodiment of the present invention shown in FIG. 1 may include a bag 11 and a belt 12 made of a woven fabric or knitted fabric surrounding the bag 11. The bag 11 is arranged along an occupant, who is sitting on a seat, extending from a breast to belly of the occupant so as to face the occupant.

The belt 12 is formed so as to hardly expand in a longitudinal direction. According to the embodiment, by performing thermo-stretching on the belt 12, the expansion in the longitudinal direction (tensile direction) of the belt is almost eliminated.

The belt 12 comprises a non-inflating section 12a and a flat hollow-cylindrical inflating section 12b. The bag 11 is arranged only within the inflating section 12b. The inflating section 12b is flexibly expandable in the width direction As mentioned above, both the inflatable and non-inflatable sections are barely expandable in the longitudinal direction.

The bag 11 is folded along crease lines extending in the longitudinal direction of the airbelt 10 at the required number of times so as to become a slender folded structure having approximately the same width as that of the inflating section 12b.

An end of the bag 11, as well as an end of the belt 12, is connected to the tongue 5.

The non-inflating section 12a of the belt 12 is inserted into the through-anchor 6 and is connected to the retractor 7 so as to enable to be wound up around and pulled out of the retractor 7.

The belt 12 is consecutively and integrally made by knitting or weaving all the parts extending from the non-inflating section 12a toward the inflating section 12b. That is, the belt 12 is not made by folding a piece of band-like cloth or textile into two so as to stitch both sides together, but it is made to be one cylinder by knitting or weaving. The belt 12 is seamless along its entire length including between the inflatable and non-inflatable sections. The inflating section 12b is made to be a flat structure having a pair of planar portions S1 and S2 by flattening the cylindrical knitted or woven fabric with, for example, a hot press, etc.

Figure 4:
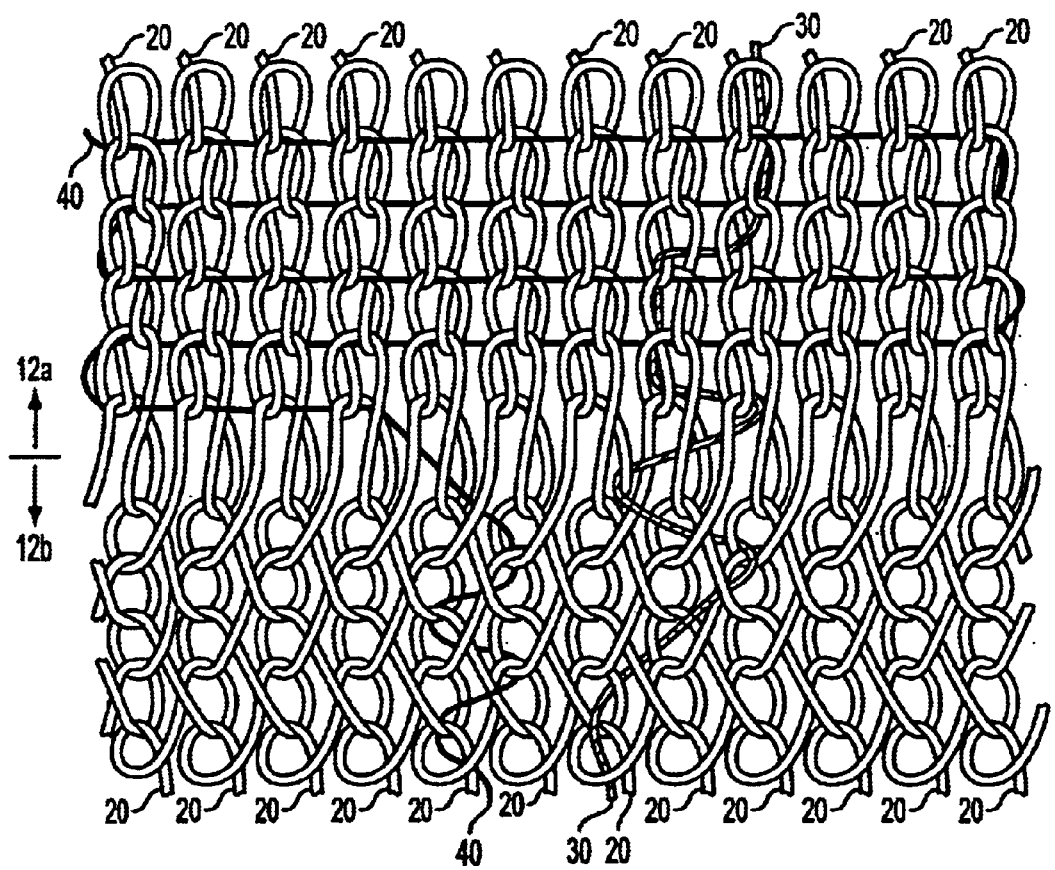
FIG. 4 schematically shows a woven or knitted structure of a non-inflating section of the belt of FIG. 1.

As shown in FIG. 4, a thread forming the knitted or woven fabric is continuous from the non-inflating section 12a toward the inflating section 12b. In the embodiment, the knitting employs chain stitch; however, it may be a denbigh stitch. In the chain stitch, plural knitting threads 20 form loops extending in the longitudinal direction of the belt. In the inflating section 12b shown in the lower part of FIG. 4, one knitting thread 20 is arranged to form two columns of loops adjacent with each other. The adjacent loops from different columns are intertwined with each other. In the non-inflating section 12a shown in the upper part of FIG. 4, thread 20 forms loops in columns. In the non-inflating section 12a, the thread 20 does not intertwine between adjacent columns of loops.

An insertion thread 30 connects adjacent columns of the knitting thread loops together. In the inflating section 12b, three columns of loops are chained together with the insertion thread 30. In the non-inflating section 12a, two columns of loops are chained together with the insertion thread 30. Although only one insertion thread 30 is depicted in FIG. 4, the same number of insertion threads as that of knitting threads 20 are preferably inserted.

Also, although twelve knitting threads 20 are depicted in FIG. 4, in practice the appropriate number of knitting threads 20 required to cover the width of the airbelt are provided.

A weft thread 40 is inserted into the belt 12. In the non-inflating section 12a, the weft thread 40 is inserted into the non-inflating section 12a over the entire width thereof at a pitch equivalent to one loop of the knitting thread 20. In the inflating section 12b, the weft thread 40 is routed through toward the airbelt end in the longitudinal direction after reciprocating only between two columns of loops.

Figure 5:
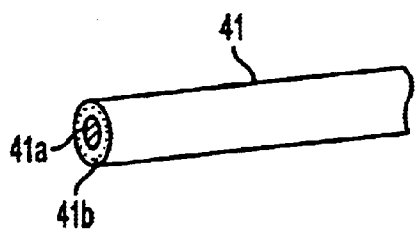
FIG. 5 is a structural view of a fusion thread.

The weft thread 40 preferably comprises a normal thread (non-fusion thread such as a regular polyester thread) and a fusion thread. The fusion thread may use a thread 41 having a core-sheath structure shown in FIG. 5 according to the preferred embodiment of the present invention. The thread 41 of the core-sheath structure includes a core 41a made of a regular polyester thread and a sheath 41b made of thermo-fusion polyester surrounding the core 41a.

By densely placing the weft thread, which is preferably formed by lining up (e.g., a double yarn) thread 41 and a normal thread, in the non-inflating section 12a, and by hot-pressing and flattening the non-inflating section 12a, the sheath 41b of the thread 41 melts into its periphery, so that the non-inflating section 12a becomes a flat and thin belt-like structure having some pliant rigidity. Due to the melting, the non-inflating section 12a has favorite abrasion resistance and sliding performance without yarn slippage.

Due to the insertion of the weft thread 40, the non-inflating section 12a substantially does not extend in the lateral direction (width direction). Therefore, when the non-inflating section 12a is wound around the retractor, the winding is regularly performed without meandering or tapering. That is, the non-inflating section 12a is wound around the retractor so as to be evenly and flatly piled up, and also slides very smoothly relative to the through-anchor.

Figure 6:
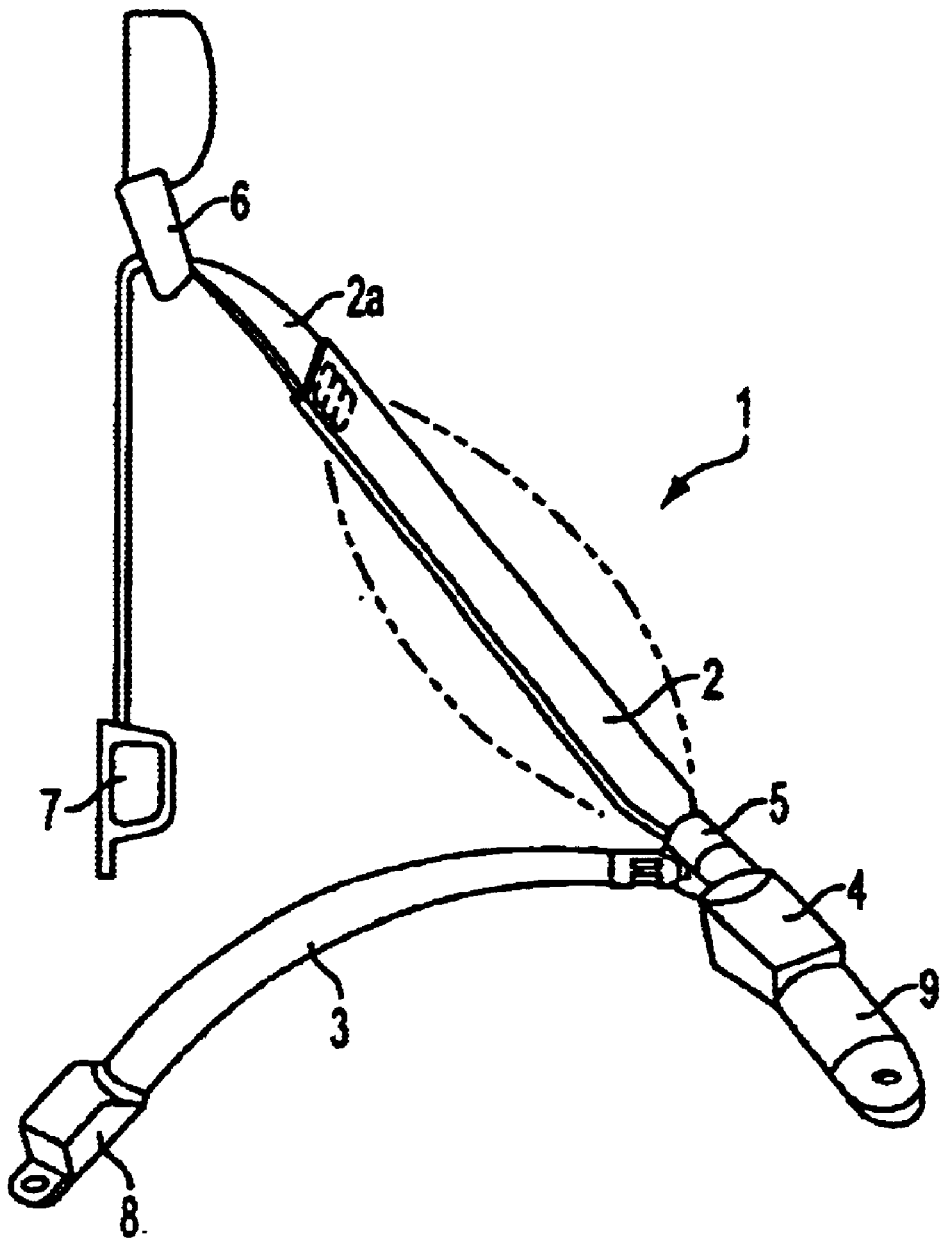
FIG. 6 is a structural representation of a conventional airbelt apparatus.

Other structures of the airbelt apparatus are the same as those shown in FIG. 6; like reference characters designate like common portions.

The airbelt apparatus configured as above is installed in an automobile by inserting the non-inflating section 12a of the airbelt 10 through the through-anchor 6. The non-inflating section 12a, just like the conventional webbing, smoothly slides relative to the through-anchor 6 while being smoothly wound around or pulled out of the retractor 7.

Figure 3:
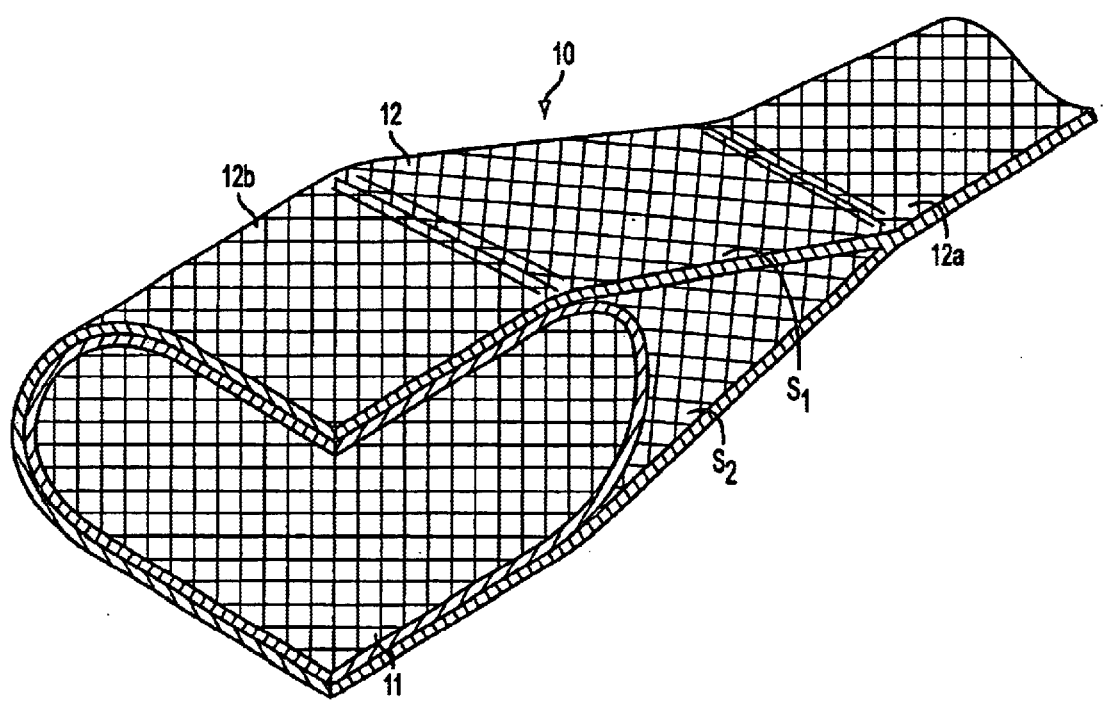
FIG. 3 is a sectional view of the airbelt of FIGS. 2(a)-2(d) at an inflated state.

In the airbelt apparatus according to the present invention, when the gas generator 9 is operated in the state that the tongue 5 is mounted on the buckle device 4, as shown in FIG. 3, the bag 11 within the airbelt 10 is inflated. At this time, the longitudinal length of the belt 12 is reduced so that the airbelt 10 sticks to an occupant, enabling the occupant to be very securely protected. That is, as described above, the belt 12 hardly extends in the longitudinal direction of the belt due to the thermo-stretching. When the bag 11 is inflated, the stitch of the belt 12 is laterally expanded, resulting in reduction in the longitudinal length of the belt 12 so as to reduce the longitudinal length of the airbelt 10.

According to the embodiment described above, the airbelt 10 passes through the anchor 6. However, when the retractor is arranged within a pillar or a seat back, the airbelt is inserted through an airbelt insertion hole arranged in the upper part of the pillar or the seat back.

According to the embodiment described above, the weft thread 40 is lined up with a normal thread and the thread 41 of the core-sheath structure. However, only the thread 41 having the core-sheath structure may be used for the weft thread as an alternative. Furthermore, the fusion thread may be other than the thread of the core-sheath structure.

As described above, according to the present invention, the airbelt itself can be inserted through the through-anchor or the airbelt insertion hole or can be directly wound around the retractor. According to the present invention, the airbelt passes through the anchor, etc., very smoothly and may be smoothly wound around and pulled out of the retractor. The non-inflating section of the airbelt is thin and has favorite abrasion resistance without yarn slippage.

The priority application, Japanese Patent Application No. 2001-063639 filed on Mar. 7, 2001 is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbelt comprising:
   a belt having an inflatable section and a non-inflatable section; and
   a bag placed within the inflatable section of the belt,
   wherein the airbelt is inflated by introduction of gas into the bag, and
   wherein the inflatable and non-inflating sections are seamlessly formed and connected by a knitted fabric and wherein the belt includes a weft thread comprising a fusion thread, the weft thread being inserted into the non-inflating section.

2. The airbelt of claim 1, wherein the weft thread includes only the fusion thread.

3. The airbelt of claim 1, wherein the weft thread includes a non-fusion thread lined up with the fusion thread.

4. An airbelt apparatus comprising:
   an airbelt comprising:
      belt having an inflatable section and a non-inflatable section; and
      bag placed within the inflatable section of the belt,
      wherein the airbelt is inflated by introduction of gas into the bag, and
      wherein the inflatable and non-inflating sections are seamlessly formed and connected by a knitted fabric and wherein the belt includes a weft thread comprising a fusion thread, the weft thread being inserted into the non-inflating section;
   a gas generator for supplying gas into the bag of the airbelt;
   a tongue connected to one end of the airbelt; and
   a retractor for winding the other end of the airbelt.

5. The airbelt apparatus of claim 4, wherein the weft thread includes only the fusion thread.

6. The airbelt apparatus of claim 5, wherein the weft thread includes a non-fusion thread lined up with the fusion thread.

* * * * *